(No Model.)

J. W. BUNCH.
CULTIVATOR.

No. 254,606. Patented Mar. 7, 1882.

WITNESSES:
Chas. Nixa
C. Sedgwick

INVENTOR:
J. W. Bunch
BY Munn & Co
ATTORNEYS.

UNITED STATES PATENT OFFICE.

JOHN W. BUNCH, OF COMMERCIAL POINT, OHIO.

CULTIVATOR.

SPECIFICATION forming part of Letters Patent No. 254,606, dated March 7, 1882.

Application filed January 5, 1882. (No model.)

*To all whom it may concern:*

Be it known that I, JOHN W. BUNCH, of Commercial Point, in the county of Pickaway and State of Ohio, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1:
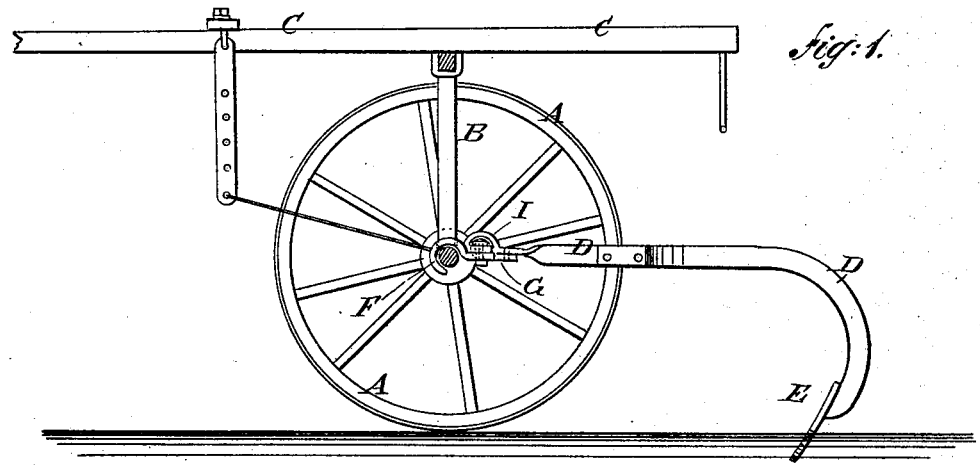
Figures 2, 4, 5:
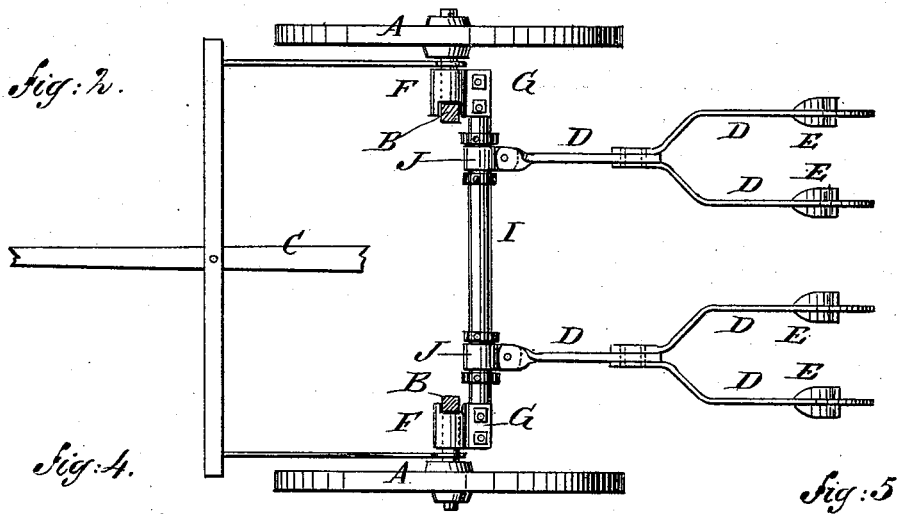
Figure 3:
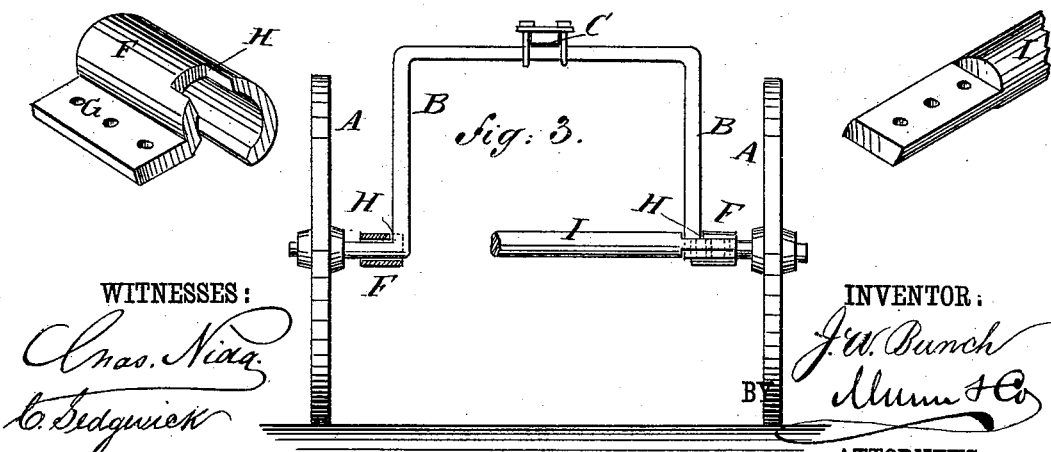

Figure 1 is a sectional side elevation of a part of a cultivator to which my improvement has been applied. Fig. 2 is a plan view of the same, partly in section. Fig. 3 is a rear elevation of the same with the plow-beams detached and partly in section. Fig. 4 is a perspective view of a part of the improvement. Fig. 5 is a perspective view of an end of the cross-bar.

The object of this invention is to enable the plowman to so adjust his cultivator in cultivating small plants that the shovels, when brought close together, will not be turned away from the plants.

The invention consists in the combination, with the arched axle of a cultivator, of couplings and a cross-bar to receive the plow-beam couplings and allow the plow-beams to be adjusted close together for cultivating small plants, as will be hereinafter fully described.

A represents the wheels, B the arched axle, C the tongue, D the plow-beams, and E the shovels, of a cultivator, all of which parts are constructed in the ordinary manner.

F are two couplings, which are made in the form of open tubes or wide hooks, and with flanges G at the upper sides of the said openings. The couplings F are placed upon the axle B at the outer sides of its arch, and have slots H in their inner ends to receive the upright arms of the said arch, as shown in Figs. 2 and 3. The flanges G are perforated to receive the bolts by which the couplings F are secured to the ends of the cross-bar I. The bar I crosses the lower part of the arch of the axle B at its rear side, and to it are attached the couplings J, secured to the forward ends of the plow-beams D. The couplings J can be secured in place upon the cross-bar I by collars and set-screws, or other suitable means.

With this improvement the shovels E can be brought close together for cultivating small plants by coupling the forward ends of the plow-beams to the cross-bar I in such positions that the plow-beams D will be parallel with the line of draft, so that the shovels E will be in proper position for throwing soil around the plants instead of being turned from the plants, as they must be when the plow-beams are connected with the axle in the ordinary manner.

The improvement is used only when the plants are small, so that the cross-bar I can pass over them without danger of breaking the stalks or otherwise injuring the plants. When the plants become large the coupling-hooks F and the cross-bar I are detached, and the plow-beams D are connected with the axle B in the ordinary manner.

Having thus described my invention, I claim as new and desire to secure by Letters Patent—

In a cultivator, the combination, with the arched axle B, of the couplings F and the cross-bar I, substantially as herein shown and described, whereby the plow-beams can be adjusted close together for cultivating small plants, as set forth.

JOHN W. BUNCH.

Witnesses:
JAMES RAWLINS,
WILLIAM ABBOT.